United States Patent
Lin et al.

(10) Patent No.: US 6,931,023 B2
(45) Date of Patent: Aug. 16, 2005

(54) ACCESS DEVICE AND METHOD THEREOF FOR ACCESSING A NETWORK

(75) Inventors: Freddie Lin, Redondo Beach, CA (US); Ling Sha, Los Angeles, CA (US); Frank Tian, Temple City, CA (US); Duke Tran, Norwalk, CA (US)

(73) Assignee: Physical Optics Corporation, Torrance, CA (US)

( * ) Notice: Subject to any disclaimer, the term of this patent is extended or adjusted under 35 U.S.C. 154(b) by 898 days.

(21) Appl. No.: 09/761,109

(22) Filed: Jan. 16, 2001

(65) Prior Publication Data

US 2002/0093975 A1 Jul. 18, 2002

(51) Int. Cl.[7] .............................................. H04L 12/43
(52) U.S. Cl. ........................................ 370/458; 370/468
(58) Field of Search ................................. 370/360, 375, 370/458, 468, 493, 498, 535, 537, 538, 540, 395.1, 470

(56) References Cited

U.S. PATENT DOCUMENTS

| | | | | |
|---|---|---|---|---|
| 4,485,468 A | * | 11/1984 | Slana | 370/358 |
| 5,313,467 A | * | 5/1994 | Varghese et al. | 370/468 |
| 5,535,207 A | * | 7/1996 | Dupont | 370/433 |
| 5,671,223 A | * | 9/1997 | Shachar et al. | 370/471 |
| 6,373,860 B1 | * | 4/2002 | O'Toole et al. | 370/493 |
| 6,633,566 B1 | * | 10/2003 | Pierson, Jr. | 370/395.1 |

OTHER PUBLICATIONS

A Modular Telemetry Data Access Technique, Jan., 1999, Physical Optics Corporation, Torrance, CA.

* cited by examiner

Primary Examiner—Kwang Bin Yao
(74) Attorney, Agent, or Firm—Leonard Tachner

(57) ABSTRACT

The present invention provides an access device which includes a timeslot allocation table having timeslot allocation information and a transmitter coupled to the timeslot allocation table. The transmitter transmits data and updated timeslot allocation information in accordance with the timeslot allocation information. The access device further includes at least one input channel where the transmitter allocates timeslot lengths for the at least one input channel according to the timeslot allocation information. The timeslot allocation table receives updated timeslot allocation information and the transmitter reallocates timeslot lengths according to the updated timeslot allocation information. The timeslot allocation table further includes timeslot allocation information for each of the at least one input channel.

23 Claims, 8 Drawing Sheets

ACCESS DEVICE AND METHOD THEREOF FOR ACCESSING A NETWORK

BACKGROUND OF THE INVENTION

1. Field of Invention

The present invention is directed to a method and apparatus for accessing a network.

2. Description of Related Art

Presently, network devices provide access to networks for users. For example, a user accesses a wide area network through the user's network device and through network devices located at Central Offices. Additionally, the user accesses local area networks and metropolitan area networks through network devices. For example, the user can access a network using time division multiplexing (TDM) based network devices (e.g. T1 or video) or packet switching based network devices (e.g., Ethernet).

Unfortunately, the network devices do not provide for optimal allocation of bandwidth, timeslots, and clock cycles for users. For example, a user is allocated a timeslot of fixed duration or multiple timeslots of fixed duration, regardless of the user's specific needs. In particular, the user may only need a fraction of a timeslot or a non-integer multiple of the timeslot. This results in a fraction of the allocated timeslot being unused. Thus, the unused fraction of the allocated timeslot results in wasted bandwidth.

Another problem with existing network devices is that they do not provide for efficient reallocation of bandwidth for users. This comes from the fact that the user's requirements for bandwidth may change. For example, a user's company may experience growth, and thus the user will require more bandwidth. Existing TDM network devices provide for a fixed allocation of bandwidth, timeslots, and clock cycles for the user. Therefore, extensive, expensive and timely reconfigurations must be performed for the reallocation of additional bandwidth for the user. Furthermore, the user must place an order with a service provider to obtain the extensive reconfigurations after a long waiting period for network provision.

In addition, very often users need a mixture of TDM and packetized data streams. The use of TDM-only network devices for transmitting packetized data streams suffers from the sub-optimal allocation of network access bandwidth. This is because the bursty transmission nature of the packetized data stream is difficult to allocate "just-right" bandwidth without wasting bandwidth and dropping data packets. Furthermore, the use of packet switching network devices for transmitting TDM data creates problems in delivering continuous data streams (e.g. video) without interruption.

SUMMARY OF THE INVENTION

The present invention provides an access device which includes a timeslot allocation table having timeslot allocation information and a transmitter coupled to the timeslot allocation table. The transmitter transmits data and updated timeslot allocation information in accordance with the timeslot allocation information.

The access device further includes at least one input channel where the transmitter allocates timeslot lengths for the at least one input channel according to the timeslot allocation information. The timeslot allocation table receives updated timeslot allocation information and the transmitter reallocates timeslot lengths according to the updated timeslot allocation information. The timeslot allocation table further includes timeslot allocation information for each of the at least one input channel, and the access device also further includes at least one input channel.

The transmitter includes a time division multiplexer which time division multiplexes data from the at least one input channel into timeslots according to the timeslot allocation information. The timeslot allocation information includes the number of clock cycles allocated to each of the at least one input channel. In addition, the transmitter transmits updated timeslot allocation information in a reserved slot along with the transmitted data.

The access device also includes a second timeslot allocation table having second timeslot allocation information, and a receiver coupled to the second timeslot allocation table and also coupled to the transmitter. The access device additionally includes a controller coupled to the timeslot allocation table. The controller receives updated timeslot allocation information and updates the timeslot allocation table with the updated timeslot allocation information. The updated timeslot allocation information includes information regarding the addition of new channels. The updated timeslot allocation information also includes information regarding the removal of existing channels.

The present invention additionally provides a method of controlling access to a network. The method includes the steps of reserving a portion of transmitted data for timeslot allocation information of at least one channel and storing the timeslot allocation information in a timeslot allocation table. The method also includes the step of time division multiplexing the timeslot allocation information with the transmitted data. The method further includes the step of updating the timeslot allocation information with updated timeslot allocation information to reallocate a timeslot for the at least one channel.

The updated timeslot allocation information includes information regarding the addition of a second channel to the at least one channel, and the updated timeslot allocation information includes information regarding the subtraction of a second channel from the at least one channel. In addition, the updated timeslot allocation information includes information regarding increasing the length of a timeslot allocated to the at least one channel. Finally, the updated timeslot allocation information includes information regarding decreasing the length of a timeslot allocated to the at least one channel.

The present invention also provides a method of coupling several physical timeslots in non-adjacent slots into one virtual timeslot for either TDM or packetized data streams of larger bandwidth without losing their corresponding characteristics (data type, time stamp, packet sequences, etc.). Also, each physical timeslot can be assigned for either TDM or packetized data traffic.

Thus, the present invention provides for efficient bandwidth allocation of network resources to users. Bandwidth is not wasted because the bandwidth, timeslots, and clock cycles can be efficiently allocated to the users based on their current needs. Additionally, bandwidth is reallocated efficiently because the bandwidth, timeslots, and clock cycles are dynamically and flexibly reallocated to the users. These benefits are achieved by allocating a small portion of bandwidth for interactive purposes while preserving the capability to handle multiformat data and preserve time-sensitive data.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
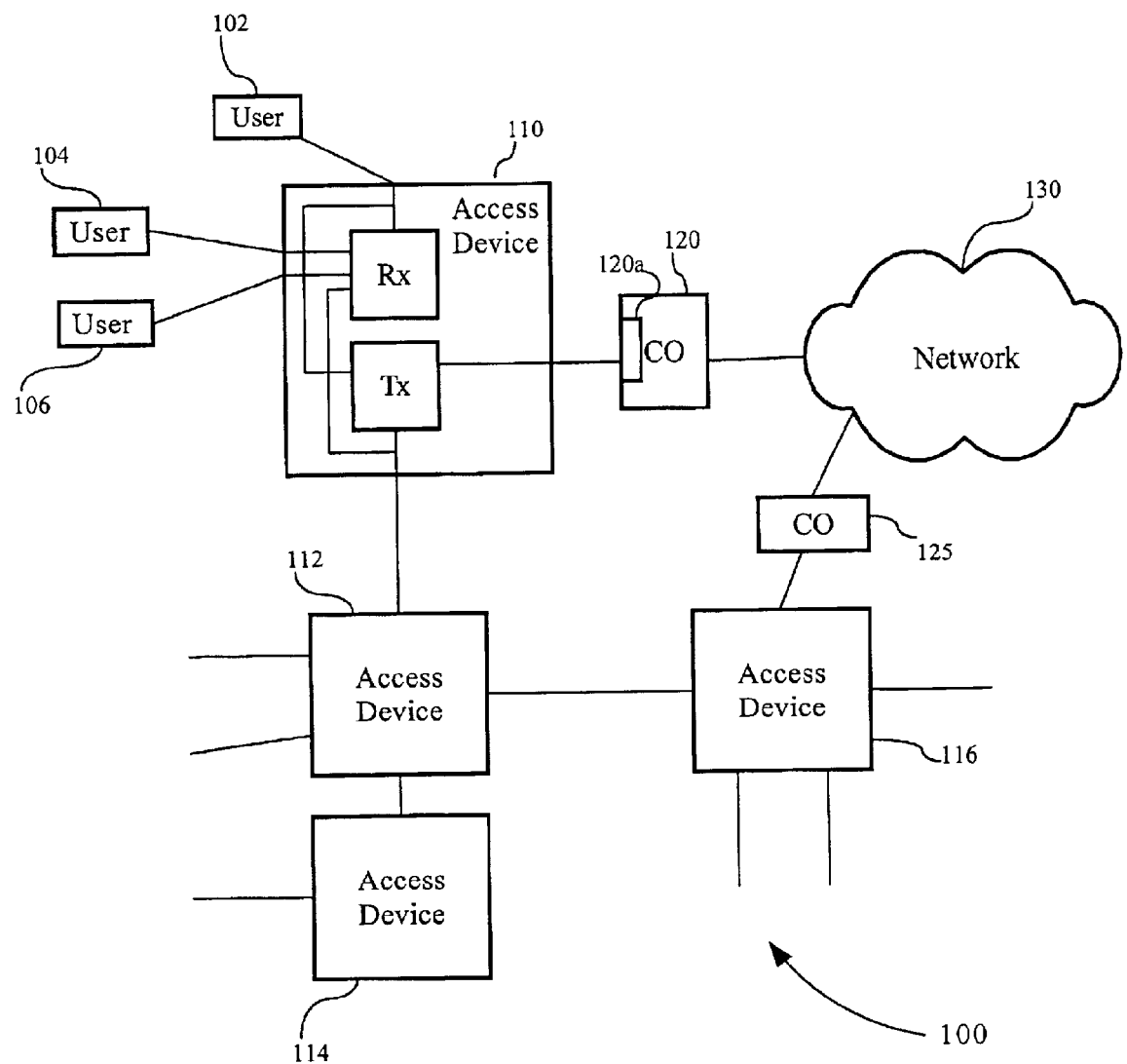
FIG. 1 is an exemplary illustration of a system for accessing a network according to a preferred embodiment.

FIG. 1 is an exemplary illustration of a system 100 for accessing a network 130 according to a preferred embodiment. The system 100 includes users 102, 104 and 106, access devices 110, 112, 114 and 116, central offices 120 and 125, and a network 130. Users 102, 104, and 106 are users such as video/audio sources, data terminals, enterprise local area networks, or the like. Central office 120 is a connection system such as a central office, a point of presence, a head end, or any other system that performs network data switching/routing functions or provides connections to a network. Typically, another access device 120a is located in the central office to connect with the access device 110. Network 130 is a network such as a metropolitan area network, a wide area network, or any other network. The system 100 provides for interactivity between the access devices.

The access device 110 acts at the boundary of the network 130 to transmit and receive multi-format data including telephony data (DS0, T1, DS3, etc.) asynchronous transfer mode over SONET data, Ethernet data, audio/video data, and the like. The access device 110 allocates a portion of bandwidth for the interactive purpose of the dynamic timeslot allocation of channels. For example, the access device 110 can allocate a timeslot for transmission of timeslot allocation information. The access device 110 allows a user 102 to dynamically reallocate the allocation of the user's bandwidth. For example, the user 102 can request the access device 110 to reconfigure the allocation of bandwidth, timeslots, or clock cycles based on the user's needs. Thus, the user 102 can increase or decrease the number of timeslots allocated to the user 102 or the width of the timeslots allocated to the user 102. For example, on an Ethernet network providing 10 Mb/s, the user 102 may begin with an allocation of 1 Mb/s. The user 102 can later request the access device 110 to increase the allocation from 1 Mb/s to 3 Mb/s. The user 102 can also request the access device 110 to reconfigure the allocation of bandwidth based on the user's needs. For example, the bandwidth of a timeslot can change from 10 Mb/s to 100 kb/s. The access device 110 can also increase or decrease the number of available timeslots in a specified time period. Thus, the number of available timeslots can be a fraction or a multiple of the original available timeslots. The user 102 can access the access device 110, for example, by using a web page linked to the access device 110 to change the bandwidth, timeslots, or clock cycles allocated to user 102.

In operation, a user 102 utilizes the access device 110 to access the network 130 or to access other access devices 112 and 116. The access device 110 accesses the network 130 through the central office 120. The access device 110 allocates a number of multiplexed timeslots of a specific length to the user 102 based on the user's desired bandwidth. If the user 102 later requires more or less bandwidth, the user 102 requests the access device 110 to change the bandwidth, the timeslots, or the duration of timeslots.

Figure 2:
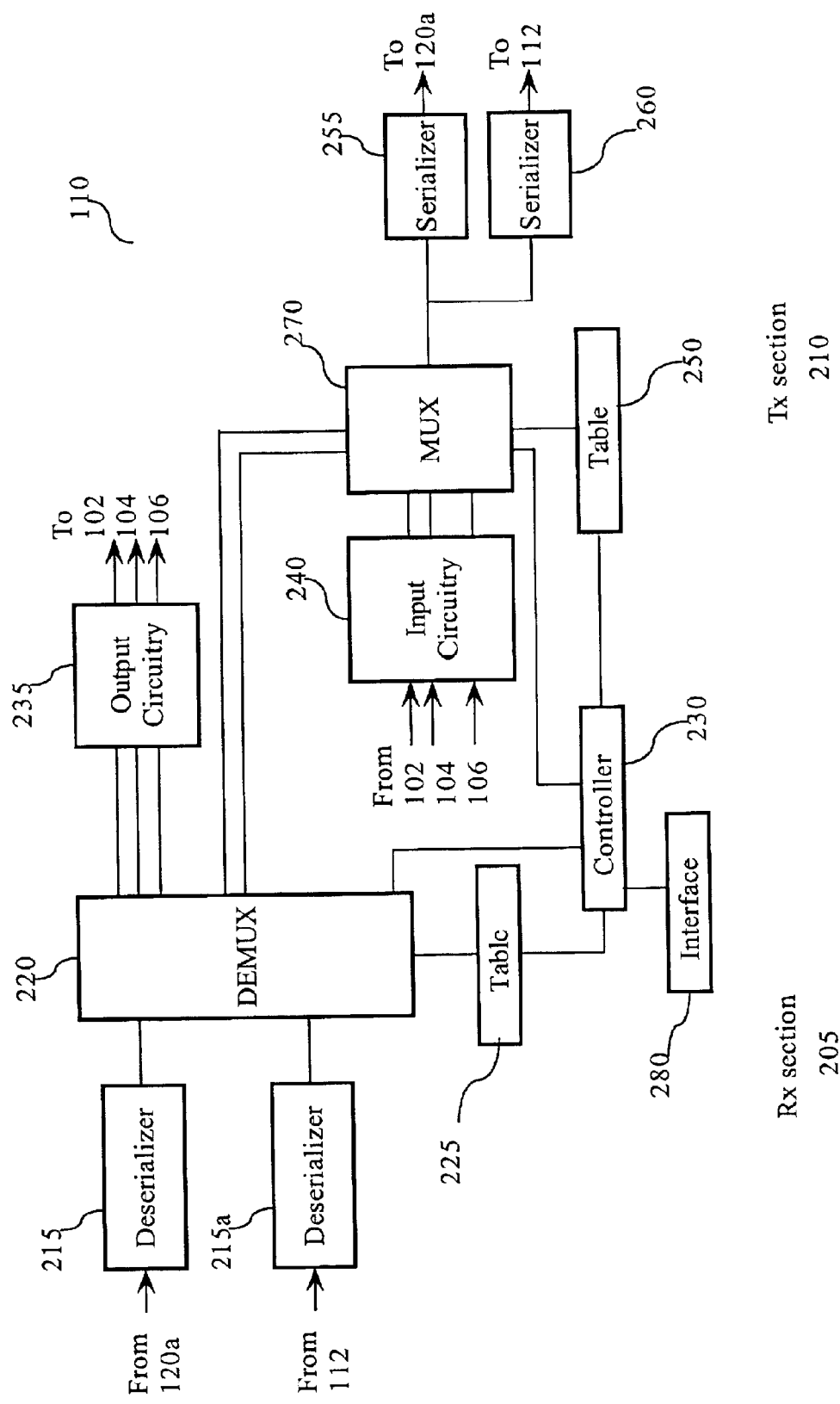
FIG. 2 is an exemplary illustration of an access device according to a preferred embodiment.

FIG. 2 is an exemplary illustration of an access device 110 according to a preferred embodiment. The access device 110 can include a receiver section 205 and a transmitter section 210. The access device 110 can further include deserializers 215 and 215a, a demultiplexer 220, a receiver table 225, a controller 230, output circuitry 235, input circuitry 240, a transmitter table 250, serializers 255 and 260, a multiplexer 270, and an interface 280. The deserializer 215 deserializes data received from the central office 120 through the access device 120a. The deserializer 215a deserializes data received from the other access device 112 in FIG. 1. The demultiplexer 220 demultiplexes channels and timeslot allocation information from the deserialized data. The output circuitry 235 outputs dropped channels from the demultiplexer 220 to users 102, 104 and 106. The input circuitry 240 also receives added channels from users 102, 104 and 106. The input circuitry 240 conditions the channels and sends the channels to the multiplexer 270. The multiplexer 270 multiplexes the channels and timeslot allocation information. For example, the multiplexer 270 multiplexes updated timeslot allocation information in a reserved timeslot along with channels in other timeslots. The serializer 255 outputs data to the central office 120 via the access device 120a. Another serializer 260 outputs data to the access device 112. The connections between the access device 110 and user 102, 104, 106 and other access devices 112 and 120a can be either fiber optic or electrical cable/twisted pair connections.

The receiver table 225 includes timeslot allocation information utilized by the demultiplexer 220 for demultiplexing the channels according to corresponding information in the timeslot allocation information. The transmitter table 250 includes timeslot allocation information utilized by the multiplexer 270 for multiplexing the channels and the updated timeslot allocation information. The interface 280 allows users to access the access device 110 to dynamically change the bandwidth, timeslots, or clock cycles allocated to the users.

The controller 230 controls the timeslot allocation information. For example, the controller 230 controls the dropping and adding of channels. The controller 230 also updates the tables 225 and 250 with updated timeslot allocation information. The controller 230 further reallocates timeslot length according to updated timeslot allocation information. Accordingly, the controller 230 can increase or decrease the length of a timeslot, the number of timeslots, or the bandwidth allocated to a channel. The controller 230 can also couple non-adjacent timeslots into one virtual time slot. The updated timeslot allocation information includes information received from other access devices 112, information received from users 102, 104, and 106 and information regarding added and dropped channels. The timeslot allocation information further includes information regarding the allocation of the multiplexed timeslots for transmitted and received channels and the length of the multiplexed timeslots. For example, the timeslot allocation information includes the number of clock cycles allocated to input and output channels. The timeslot allocation information can also contain the corresponding characteristic data type (time stamp, packet sequence, etc.) of each timeslot whether carrying TDM or packetized data.

In operation, serial data enters the deserializer 215 and 215a, where it is deserialized and output to the demultiplexer 220. The demultiplexer 220 time division demultiplexes channels received according to timeslot allocation information located in the receiver table 225. At specified intervals, the demultiplexer 220 also demultiplexes updated timeslot allocation information from the serial data for updating the timeslot allocation information in the receiver table 225. The demultiplexer 220 drops some channels for sending to users 102, 104 and 106 through the output circuitry 235. The demultiplexer 220 also sends the remaining channels to the multiplexer 270.

The input circuitry 240 adds new channels from users 102, 104, and 106 which are sent to the multiplexer 270. The multiplexer 270 time division multiplexes the remaining channels, the new channels, and updated timeslot allocation information according to timeslot allocation information located in the transmitter table 250. The multiplexer 270 sends the multiplexed channels through the serializer 255 to the central office 120 and through the serializer 260 to the access device 112.

Figure 3:
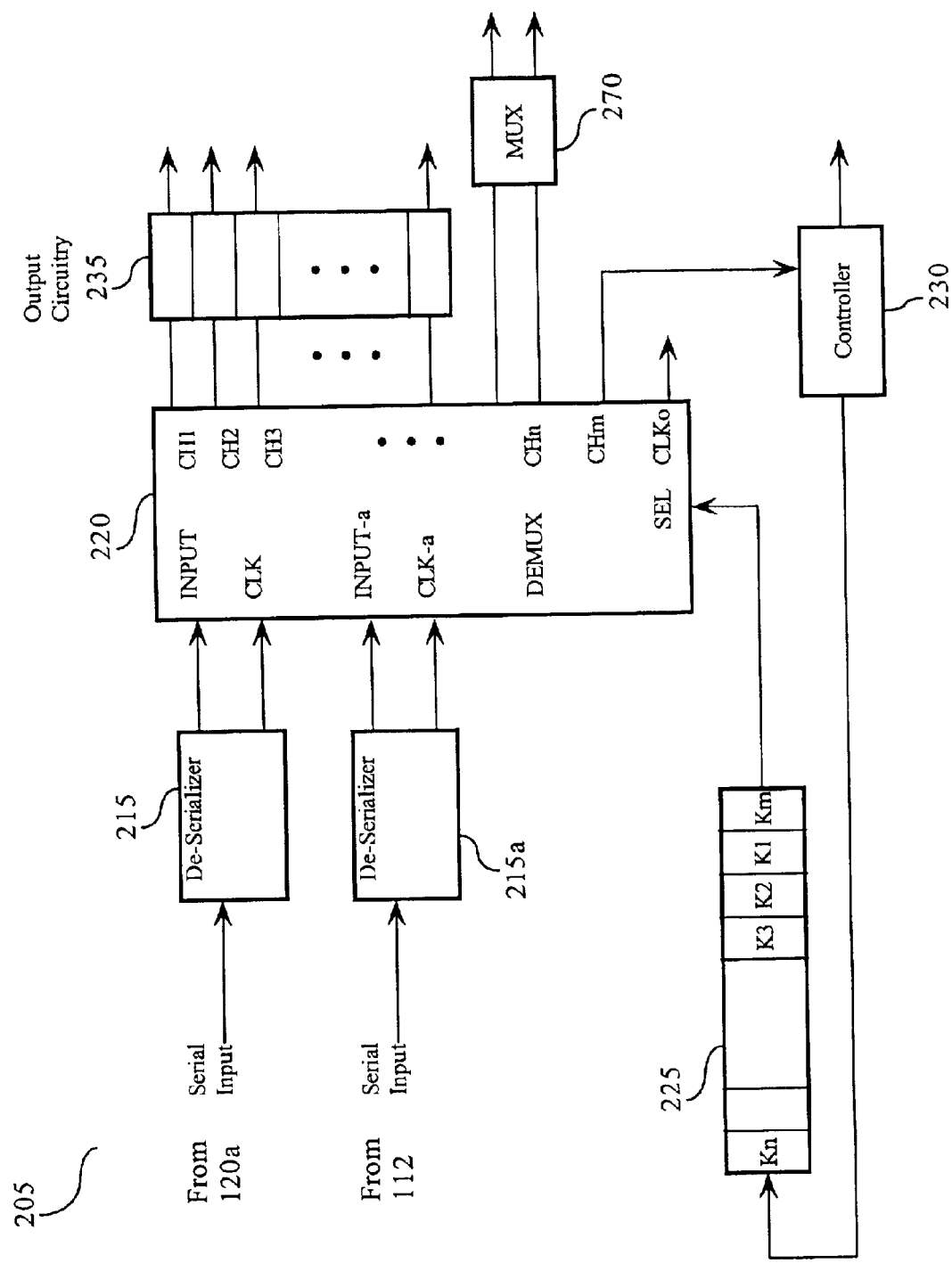
FIG. 3 is an exemplary illustration of the receiver of the access device according to a preferred embodiment.

FIG. 3 is an exemplary illustration of the receiver section 205 of the access device 110 according to a preferred embodiment. The receiver section 205 includes deserializers 215 and 215a, a demultiplexer 220, output circuitry 235, a receiver table 225, and a controller 230. The deserializer 215 or 215a deserializes received data and extracts a clock signal for the demultiplexer 220. The demultiplexer 220 demultiplexes channels 1–n. The demultiplexer 220 engages in time division multiplexing with timing according to information in the receiver table 225. The receiver table 225 includes timeslot allocation information Ki for each timeslot (i=1 . . . n). The receiver table 225 can also be known as a channel selection pipe. Each Ki selects channel CHi as a demultiplexed output of the demultiplexer 220 for a specified number of clocks Ki where i represents the respective channel. The demultiplexer 220 also demultiplexes updated timeslot allocation information located in timeslot CHm. CHm is utilized for management. In particular, CHm is utilized to receive data for the receiver table 225 and to synchronize it with a multiplexer engine at the transmitter end of the central office's access device 120a and another access device 112. The controller 230 receives the updated timeslot allocation information and updates the tables 225 and 250 (not shown in FIG. 3) accordingly. In particular, the controller 230 updates channel allocations K1–Kn in accordance with the information received from CHm.

In operation, the deserializers 215 and 215a deserialize the serial input for the channels and the updated timeslot allocation information for the demultiplexer 220. The demultiplexer 220 demultiplexes channels CH1–CHn and the management channel CHm according to the timeslot allocation information located in the receiver table 225. The demultiplexer 220 outputs the channels CH1–CHn to either output circuit 235 or multiplexer 270 and the management channel CHm which includes the updated timeslot allocation information. The controller 230 updates the receiver table 225 with the updated timeslot allocation information for the next cycle of received data. The demultiplexer 220 also synchronizes clocks CLK and CLK-a from deserializers 215 and 215a and generates a master clock CLKo as a main clock source for the access device 110.

Figure 4:
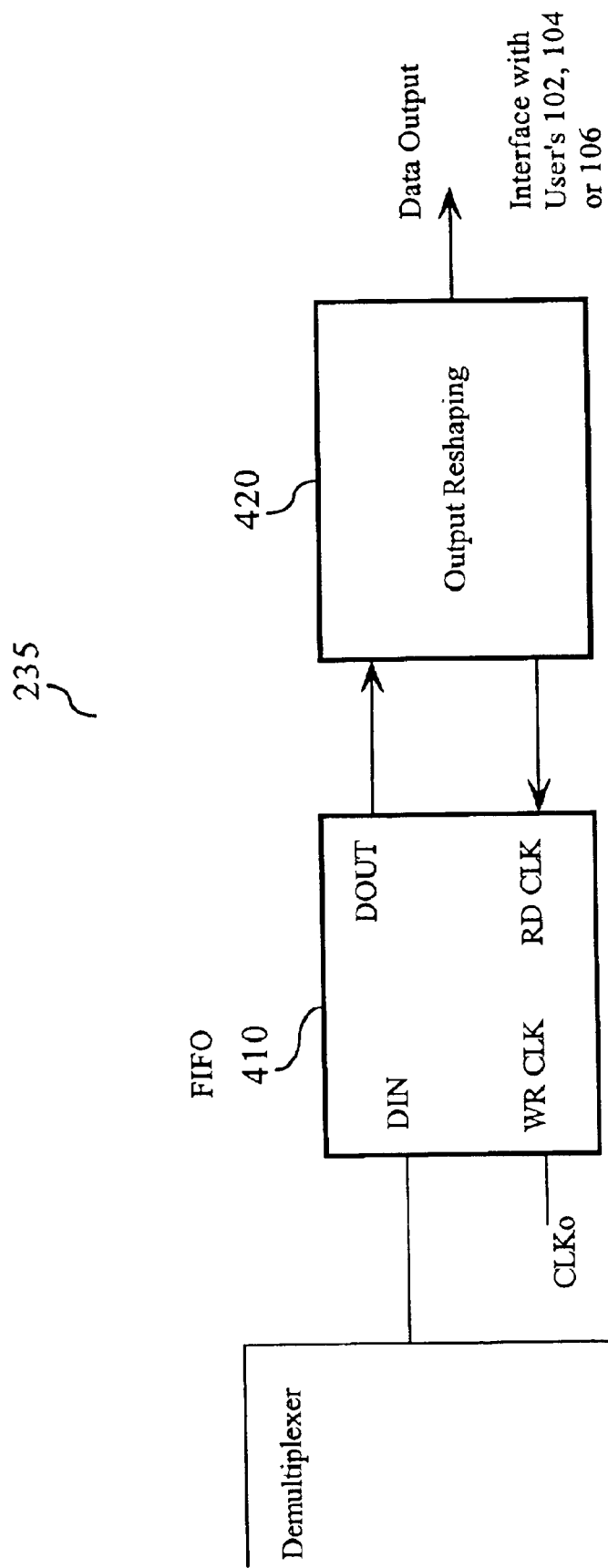
FIG. 4 is an exemplary illustration of the output circuitry of the receiver according to a preferred embodiment.

FIG. 4 is an exemplary illustration of the output circuitry 235 of the receiver section 205 according to a preferred embodiment. The output circuitry 235 includes a first in first out circuit (FIFO) 410 and output reshaping circuitry 420. The FIFO 410 buffers the data for output from the receiver section 205. The output reshaping circuitry 420 converts buffered data into a proper data format (e.g., Ethernet, video, etc.) and a clock speed for interface with user's device.

Figure 5:
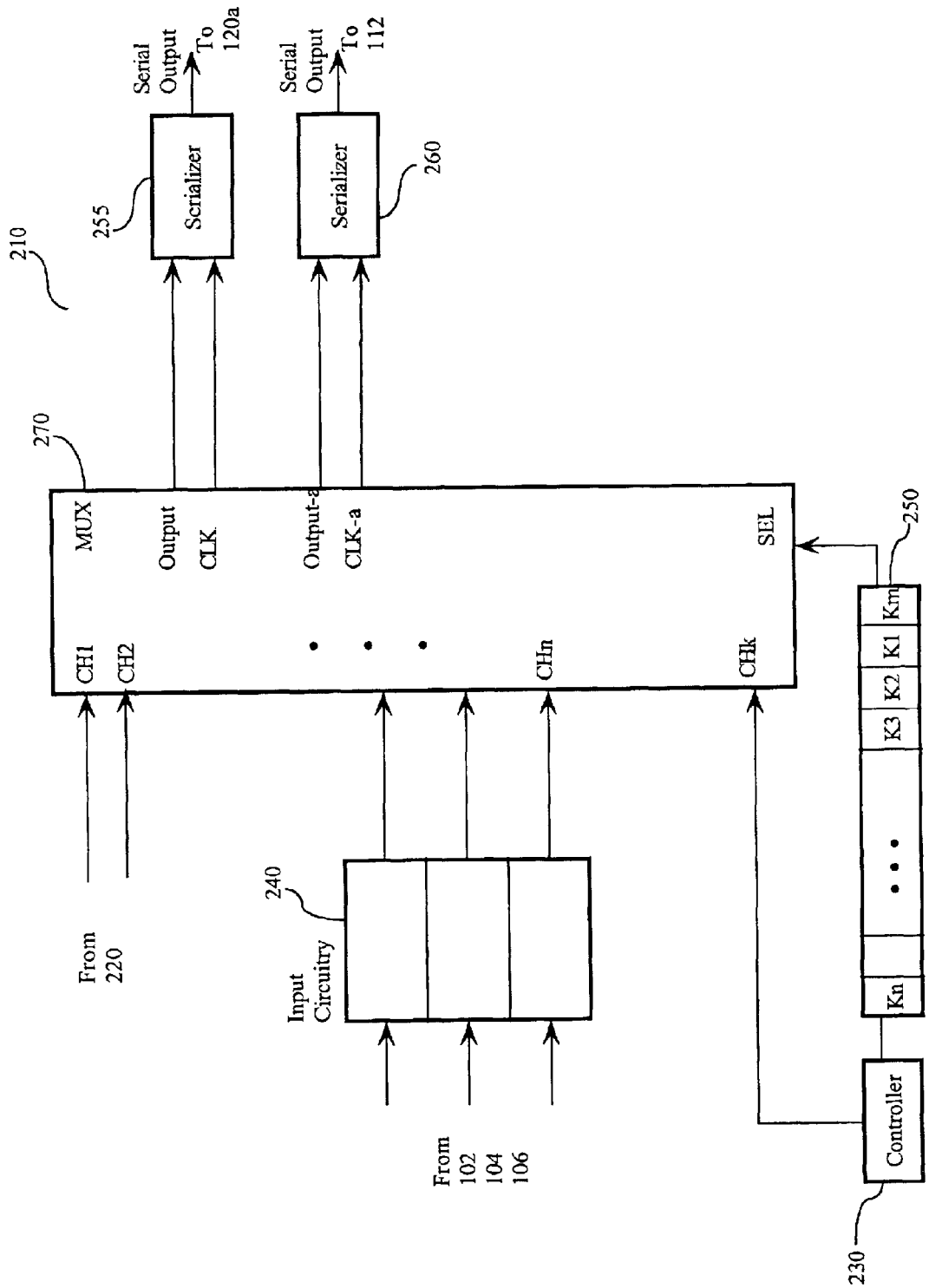
FIG. 5 is an exemplary illustration of the transmitter of the access device according to a preferred embodiment.

FIG. 5 is an exemplary illustration of the transmitter section 210 of the access device 110 according to a preferred embodiment. The transmitter section 210 includes a multiplexer 270, serializers 255 and 260, input circuitry 240, a controller 230, and a transmitter table 250. The multiplexer 270 accepts channels from input circuitry 240, demultiplexer 220, and a management channel from the controller 230. The multiplexer 270 multiplexes all these channels into at least one group with each group being transmitted to a different location (e.g., the central office 120 or other access device 112). Each group of multiplexed channel data is serialized by the serializers 255 and 260 before output.

The multiplexer 270 time division multiplexes the input channels in accordance with timeslot allocation information in the transmitter table 250. Each set of timeslot allocation information Ki in the transmitter table 250 will select a channel CHi as the multiplexer output for Ki clocks. Km is for timeslot allocation information management. The purpose of Km is to send the information in the transmitter table 250 itself to a demultiplexer engine at a receiving end. The aggregate bandwidth per channel is determined by each corresponding timeslot. Therefore, where there are n input channels each with bandwidth Bi, for example, in bits per second, the quantized input bandwidth Qi is determined from:

$$Qi=Ki*Q$$

Where Ki is the smallest integer such that Qi=Ki*Q>Bi. Q is the unit bandwidth for quantization, for example, 128 Kbps. Ki is the number of clock cycles allocated for each channel. Km is the number of clocks reserved for the management channel, for example, reserved for updated timeslot allocation information.

For clock allocation, the ratio of each channel's bandwidth is:

$$Q1:Q2:Q3: \ldots QN:Qm=K1Q:K2Q:K3Q: \ldots KnQ:KmQ= K1:K2:K3: \ldots Kn:Km$$

The total number of clocks to multiplex one round is:

$$KT=\text{SUM}(Ki)+Km$$

Figure 6:
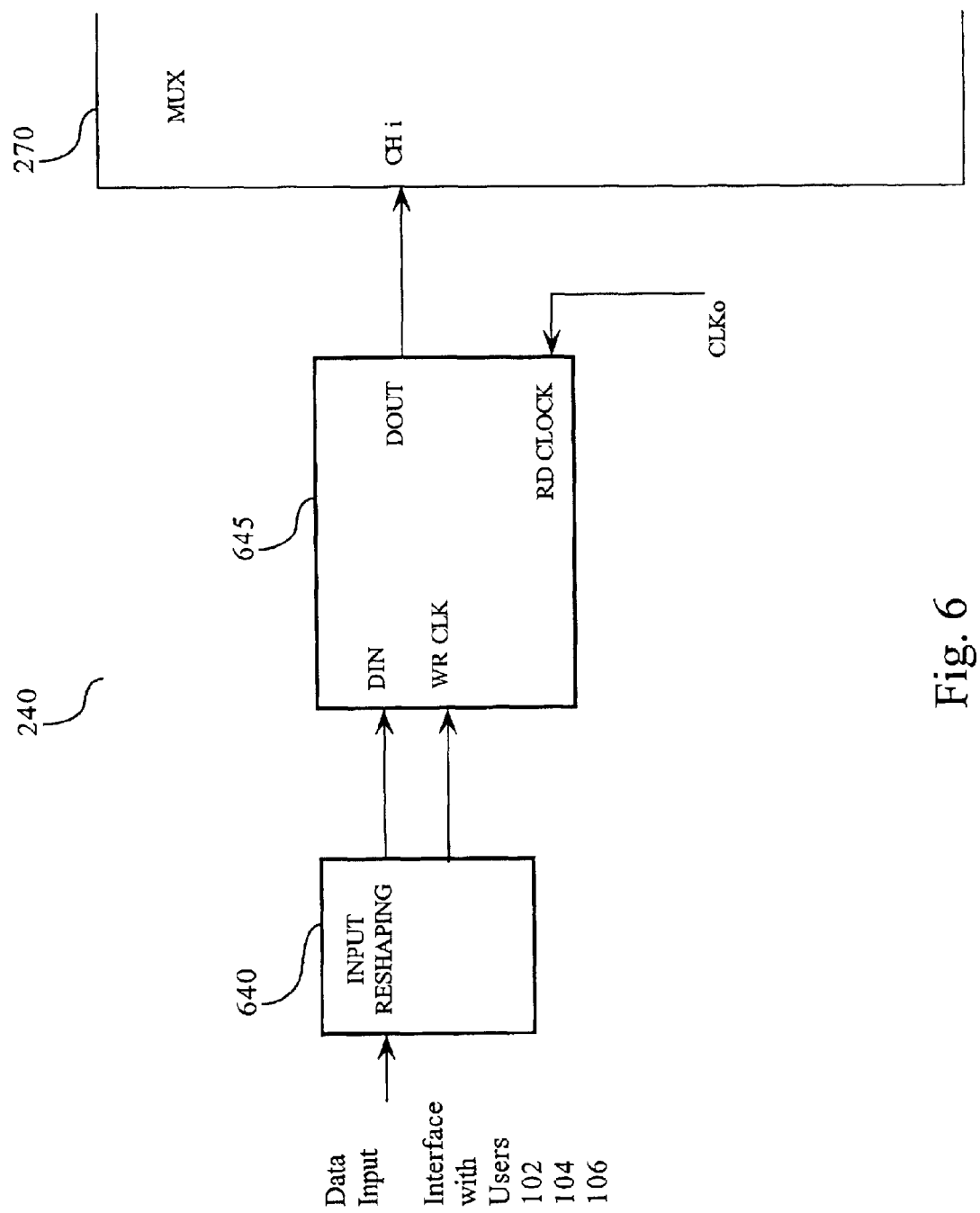
FIG. 6 is an exemplary illustration of input circuitry of the transmitter according to a preferred embodiment.

FIG. 6 is an exemplary illustration of input circuitry 240 of the transmitter section 210 according to a preferred embodiment. The input circuitry 240 includes input reshaping circuitry 640 and FIFO circuitry 645. The input reshaping circuitry 640 converts user's data (e.g., Ethernet, video, etc.) into a common data format with its corresponding clock. The FIFO 645 acts as a buffer. The input circuitry 240 also conditions the input. For example, the input circuitry 240 also reconditions a weak input signal into a strong input signal for the multiplexer 270.

Figure 7:
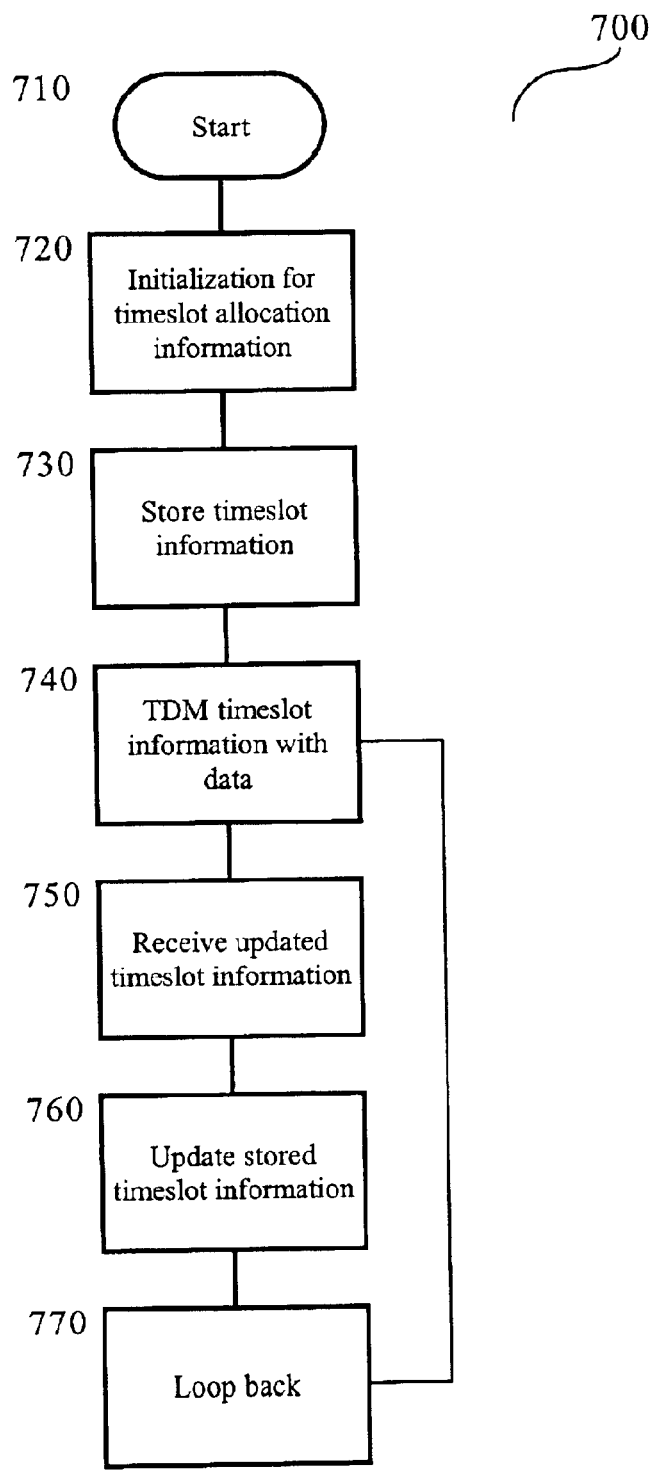
FIG. 7 is an exemplary flowchart outlining the operation of the access device according to a preferred embodiment.

FIG. 7 is an exemplary flowchart 700 outlining the operation of the access device 110 according to a preferred embodiment. In step 710 the flowchart begins. In step 720 the access device 110 initializes timeslot allocation information of at least one channel based on a user's request. In step 730 the access device 110 stores the timeslot allocation information into a timeslot allocation table. In step 740, the access device 110 time division multiplexes timeslot allocation information with transmitted data. In step 750, the access device 110 receives updated timeslot allocation information. In step 760, the access device 110 updates stored timeslot allocation information with the updated timeslot allocation information to reallocate a timeslot for the at least one channel. In step 770, the flowchart loops back to step 740 to repeat the process.

The updated timeslot allocation information can include information regarding the addition of channels to the existing channel. The updated timeslot allocation information can also include information regarding the subtraction or the dropping of channels from the existing channels. The updated timeslot information can also include information regarding increasing or decreasing the length of timeslots allocated to channels.

Figure 8:
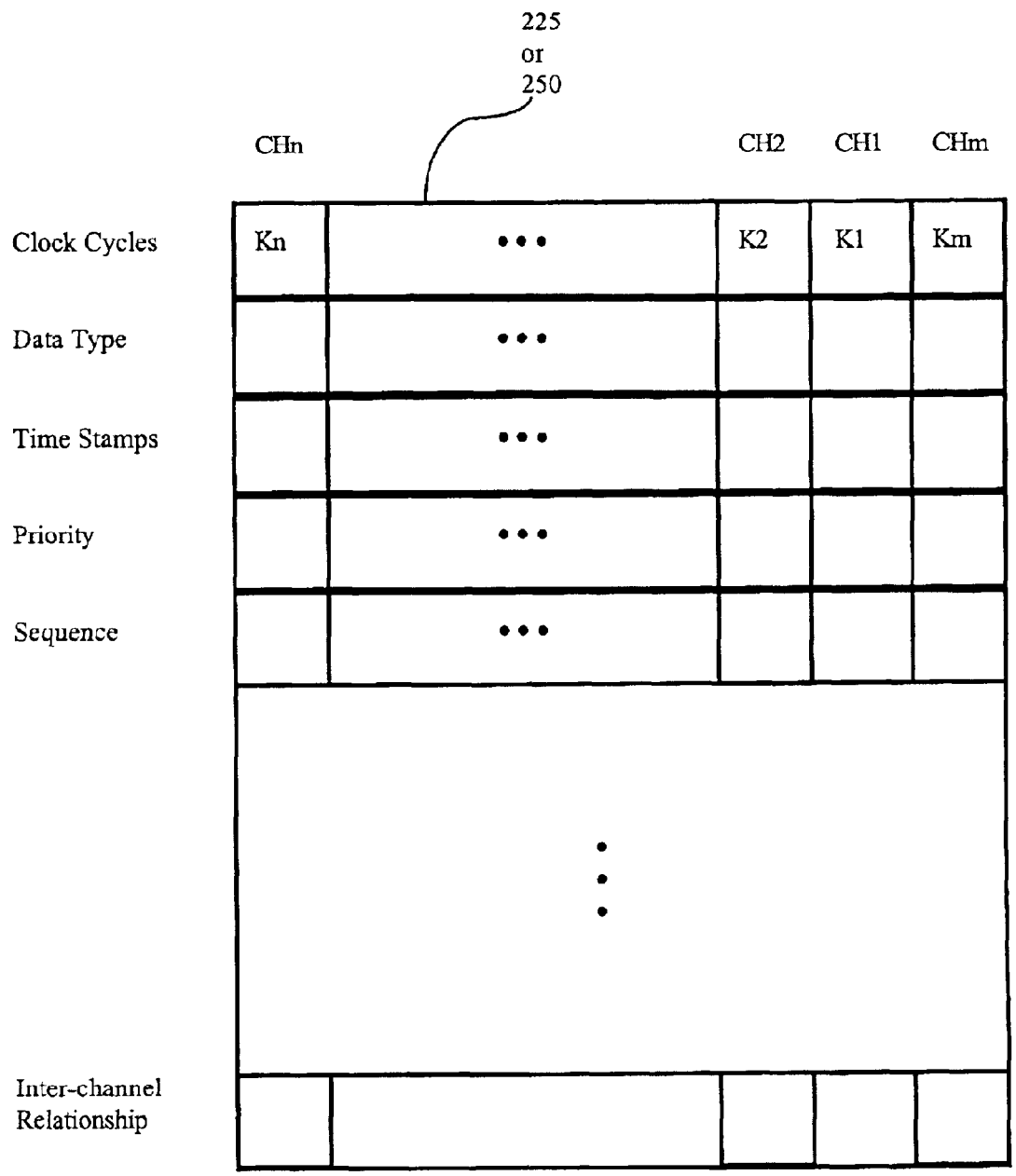
FIG. 8 is an exemplary illustration of the structure for the timeslot information allocation tables according to a preferred embodiment.

FIG. 8 is an exemplary illustration of the structure for the timeslot information allocation tables 225 or 250 according to a preferred embodiment. Because all channels are entirely independent from each other, different data types, whether TDM data, or packetized data, or others, can be assigned in each channel. In addition to clock cycle allocation, the characteristics, (including, but not limited to, data type, time stamps, priority, sequence, etc.) of each channel can be recorded in the corresponding section of the time slot allocation information table. This arrangement allows the access device 110 to deliver various data channels with proper timing synchronization, transmission priority, and data packet sequence. Thus, both TDM and packetized data traffic can be simultaneously transmitted through the access device 110 without affecting their original properties. In addition to the individual channel timeslot information, the timeslot information allocation table contains inter-channel relationship information which can be used to combine multiple non-adjacent timeslots into one virtual timeslot. For example, a space in the inter-channel relationship row can record the linking of CH3, CH5, and CH8, which indicate data in these three channels are in fact originated from the same source (or going to the same destination). Thus they are treated as one single virtual channel.

The method of this invention is preferably implemented on a programmed processor. However, access device 110 may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the controller functions of this invention.

While this invention has been described with specific embodiments thereof, it is evident that many alternatives, transformations, transpositions, modifications, and variations will be apparent to those skilled in the art. For example, various features of different embodiments of the invention can be combined and interchanged. Accordingly, the preferred embodiments of the invention as set forth herein are intended to be illustrative, not limiting. Various changes may be made without departing from the spirit and scope of the invention.

What is claimed is:

1. An access device comprising: a timeslot allocation table including timeslot allocation information; and a transmitter coupled to the timeslot allocation table, wherein the transmitter transmits data and updated timeslot allocation information in accordance with the timeslot allocation information;

wherein the timeslot allocation table includes characteristics of at least one channel recorded into a corresponding channel section of the timeslot allocation table;

wherein the characteristics of the at least one channel include at least one of data type information, time stamp information, priority information, and sequence information.

2. The access device according to claim 1, further comprising at least one input channel, wherein the transmitter further allocates timeslot lengths for the at least one input channel according to the timeslot allocation information.

3. The access device according to claim 1, wherein the timeslot allocation table receives updated timeslot allocation information and the transmitter reallocates timeslot lengths according to the updated timeslot allocation information.

4. The access device according to claim 1, wherein the timeslot allocation table further includes timeslot allocation information for each of the at least one input channel.

5. The access device according to claim 1 further comprising at least one input channel, wherein the transmitter includes a time division multiplexer and wherein the time division multiplexer time division multiplexes data from the at least one input channel into timeslots according to the timeslot allocation information.

6. The access device according to claim 5, wherein the timeslot allocation information includes the number of clock cycles allocated to each of the at least one input channel, and the channel characteristics associated to each of the at least one input channel.

7. The access device according to claim 1, wherein the transmitter transmits updated timeslot allocation information in a reserved slot along with the transmitted data.

8. The access device according to claim 1, further comprising: a second timeslot allocation table including second timeslot allocation information; and a receiver coupled to the second timeslot allocation table and coupled to the transmitter.

9. The access device according to claim 1, further comprising a controller coupled to the timeslot allocation table, wherein the controller receives updated timeslot allocation information and updates the timeslot allocation table with the updated timeslot allocation information.

10. The access device according to claim 9, wherein the updated timeslot allocation information includes information regarding the addition of channels.

11. The access device according to claim 9, wherein the updated timeslot allocation information includes information regarding the removal of channels.

12. The access device according to claim 1, wherein the characteristics of the at least one channel include inter-channel relationship information used to combine multiple non-adjacent timeslots into one virtual timeslot.

13. The access device according to claim 1, wherein the transmitter further transmits time division multiplexed data and packetized data simultaneously without disrupting the flow of the corresponding data.

14. A method of controlling access to a network comprising: reserving a portion of transmitted data for timeslot allocation information of at least one channel; and storing the timeslot allocation information in a timeslot allocation table;

wherein the timeslot allocation table includes characteristics of at least one channel recorded into a corresponding channel section of the timeslot allocation table;

wherein the characteristics of the at least one channel include at least one of data type information, time stamp information, priority information, and sequence information.

15. The method according to claim 14, further comprising time division multiplexing the timeslot allocation information with the transmitted data.

16. The method according to claim 14, further comprising updating the timeslot allocation information with updated timeslot allocation information to reallocate a time slot for the at least one channel.

17. The method according to claim 16, wherein the updated timeslot allocation information includes information regarding the addition of a second channel to the at least one channel.

18. The method according to claim 16, wherein the updated timeslot allocation information includes information regarding the subtraction of a second channel from the at least one channel.

19. The method according to claim 16, where in the updated timeslot allocation information includes information regarding increasing the length of a timeslot allocated to the at least one channel.

20. The method according to claim 16, wherein the updated timeslot allocation information includes information regarding decreasing the length of a timeslot allocated to the at least one channel.

21. The method according to claim 14, further comprising receiving received data including updated timeslot allocation information time division multiplexed with the received data.

22. The method according to claim 14, wherein the characteristics of the at least one channel include inter-channel relationship information used to combine multiple non-adjacent timeslots into one virtual timeslot.

23. The method according to claim 14, further comprising transmitting time division multiplexed data and packetized data simultaneously without disrupting the flow of the corresponding data.

* * * * *